W. G. HUGHES.
GATES.
No. 184,080.   Patented Nov. 7, 1876.
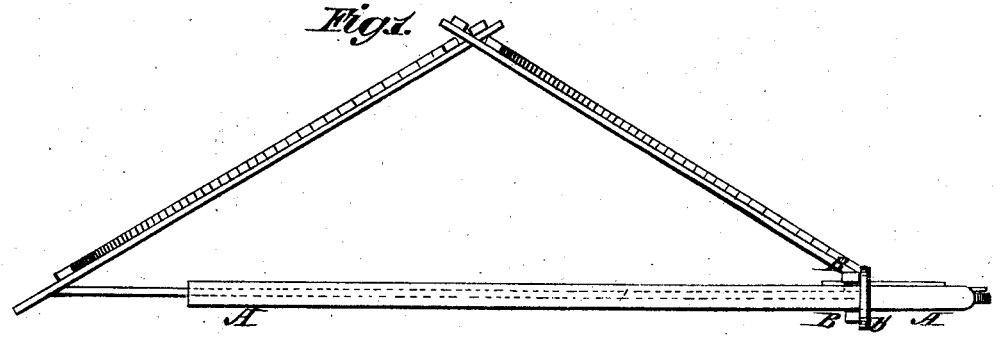
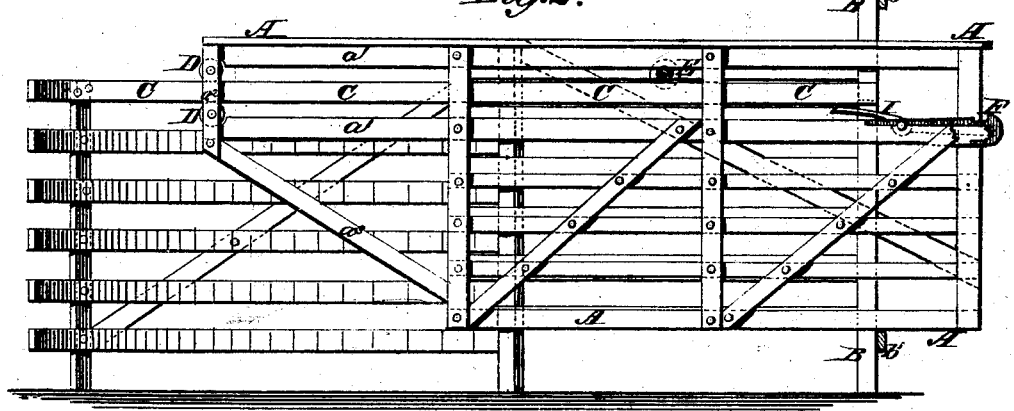
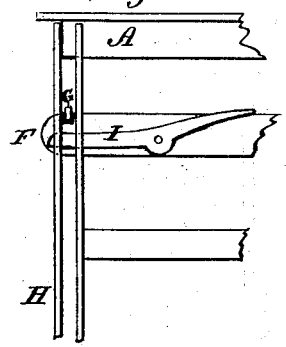
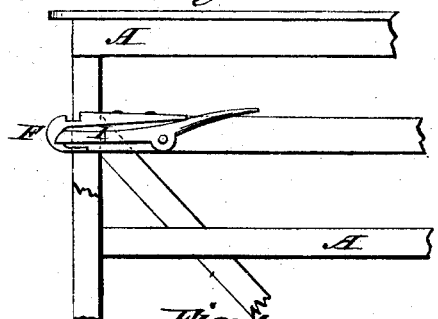
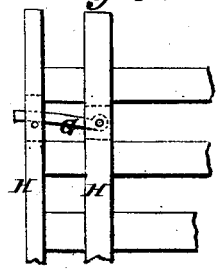
WITNESSES:
Francis McArdle
John Goethals
INVENTOR:
Wm. G. Hughes.
BY
ATTORNEYS.

UNITED STATES PATENT OFFICE.

WILLIAM G. HUGHES, OF COLUMBIA CITY, INDIANA.

IMPROVEMENT IN GATES.

Specification forming part of Letters Patent No. 184,080, dated November 7, 1876; application filed September 2, 1876.

*To all whom it may concern:*

Be it known that I, WILLIAM G. HUGHES, of Columbia City, in the county of Whitley and State of Indiana, have invented a new and useful Improvement in Farm-Gate, of which the following is a specification:

Figure 1 is a top view of my improved gate. Fig. 2 is a side view of the same. Fig. 3 is a detail view of the forward end of the gate, showing the lever for raising the latch. Fig. 4 is a detail view of the latch-post. Fig. 5 is a detail view, showing the gate latched.

Similar letters of reference indicate corresponding parts.

The invention relates to the construction and arrangement of devices for latching sliding gates.

A is the gate, which is formed by attaching cross-bars to the opposite sides of the ends of longitudinal bars, and is strengthened by attaching vertical and inclined brace-bars to said longitudinal bars. The two upper longitudinal bars $a'$ of the gate A are extended to the rearward for a distance equal to half the length of the body of the gate, more or less, and have short cross-bars $a^2$ attached to the opposite sides of their ends. The rearward extension $a^1$ is strengthened by a brace-bar, $a^3$, the rear end of which is secured to the lower ends of the bars $a^2$, and its forward end is attached to the lower ends of the rear cross-bars of the gate A. The gate A moves longitudinally between two posts, B, which are connected above and below the gate by short cross-bars $b^1$. C is a bar a little longer than the length of the gate A, and of such a thickness as to pass through the space between the rear cross-bars of the gate A and the short cross-bars $a^2$. The bar C is made narrower than the space between the two upper horizontal bars of the gate A, so that two rollers, D, may be interposed between its edges and the adjacent edges of the said two upper bars $a^1$. The rollers D are pivoted to and between the short cross-bars $a^2$, and roll along the edges of the guide-bar or way is moved forward and back, so as to keep the said gate horizontal, in whatever position it may be. The gate A rests upon a loose roller, E, placed between the lower edge of the upper horizontal bar of said gate and the upper edge of the guide-bar C, so that the said roller may adjust itself as the gate moves forward and back. The roller E is kept in place between said bars by flanges formed upon its ends. To the forward end of the gate A is attached a catch, F, the projecting end of which is beveled or rounded off, and has a notch formed upon its upper side, so that it may raise the latch G, as the gate A is pushed forward or closed, and fasten the said gate automatically.

When the gate is closed, its forward end enters the space between two posts, H, or a vertical groove in a single post. The latch G is placed in a slot in the posts or post H, across the space or groove that receives the forward end of the gate A, so that it may catch upon the catch F and latch the gate when it is closed.

I is a lever pivoted to the gate A, and its forward end projects along the side of the catch F, so that, by operating the lever I, the latch G may be raised to unfasten the gate. The rear end of the lever I projects into such a position that it may be conveniently reached and operated to unlatch the gate.

Having thus described my invention, I claim as new and desire to secure by Letters Patent—

The combination, with the sliding gate and the posts H, of the transverse pivoted latch G, catch F, and the lever I, all constructed and arranged as shown and described, to operate as specified.

WM. G. HUGHES.

Witnesses:
 MICHAEL SICKAFOOSE,
 WALTER OLDS.